United States Patent
Morelli et al.

(10) Patent No.: US 12,298,911 B2
(45) Date of Patent: May 13, 2025

(54) SPILL-TO-DISK IN PROJECTION OPERATIONS

(71) Applicant: SAP SE, Walldorf (DE)

(72) Inventors: Canberk Morelli, Mannheim (DE); Paul Willems, Heidelberg (DE)

(73) Assignee: SAP SE, Walldorf (DE)

( * ) Notice: Subject to any disclaimer, the term of this patent is extended or adjusted under 35 U.S.C. 154(b) by 132 days.

(21) Appl. No.: 18/348,225

(22) Filed: Jul. 6, 2023

(65) Prior Publication Data
US 2025/0013574 A1   Jan. 9, 2025

(51) Int. Cl.
*G06F 7/00*      (2006.01)
*G06F 12/0888*   (2016.01)
*G06F 12/0893*   (2016.01)
*G06F 16/2455*   (2019.01)

(52) U.S. Cl.
CPC ...... *G06F 12/0888* (2013.01); *G06F 12/0893* (2013.01); *G06F 16/24554* (2019.01); *G06F 2212/163* (2013.01)

(58) Field of Classification Search
CPC ............. G06F 12/0888; G06F 12/0893; G06F 16/24554; G06F 2212/163
See application file for complete search history.

(56) References Cited

U.S. PATENT DOCUMENTS

| | | | |
|---|---|---|---|
| 4,510,567 A * | 4/1985 | Chang ................... | G06F 40/166 |
| 5,089,985 A * | 2/1992 | Chang ................. | G06F 16/2457 |
| 6,263,331 B1 * | 7/2001 | Liu ..................... | G06F 16/2456 |
| 7,792,825 B2 * | 9/2010 | Hoshikawa ....... | G06F 16/24553 |
| | | | 707/723 |
| 10,664,474 B1 * | 5/2020 | Chunduru ......... | G06F 16/24544 |
| 11,537,604 B1 * | 12/2022 | Akthar ................ | G06F 16/2445 |
| 2003/0065688 A1 * | 4/2003 | Dageville .......... | G06F 16/24561 |
| 2012/0317128 A1 * | 12/2012 | Park ................... | G06F 16/24547 |
| | | | 707/E17.061 |
| 2013/0086019 A1 * | 4/2013 | Dantale ................ | G06F 16/248 |
| | | | 707/705 |
| 2016/0070726 A1 * | 3/2016 | MacNicol ........... | G06F 11/0745 |
| | | | 707/691 |
| 2017/0116271 A1 * | 4/2017 | Ziauddin ........... | G06F 16/24539 |
| 2018/0217759 A1 * | 8/2018 | Ash ...................... | G06F 12/0804 |
| 2019/0026339 A1 * | 1/2019 | Bastawala ............ | G06F 16/221 |
| 2019/0075183 A1 * | 3/2019 | Silberkasten ........ | H04L 67/145 |

(Continued)

*Primary Examiner* — Mohammed R Uddin
(74) *Attorney, Agent, or Firm* — Mintz Levin Cohn Ferris Glovsky and Popeo, P.C.

(57) ABSTRACT

A system and/or method for spill-to-disk in projection operations includes receiving a query including a projection, receiving a plurality of rows in response to the query processed by a processing thread of a plurality of processing threads, determining whether the query specifies an order for the plurality of rows, determining whether a disk buffer associated with the processing thread contains a stored row in response to the query specifying the order, storing the plurality of rows in the disk buffer in response to determining the disk buffer contains the stored row, storing the plurality of rows in a memory buffer associated with the processing thread in response to determining the disk buffer does not contain the stored row and the memory buffer contains at least a threshold amount of memory to store the plurality of rows, and providing the stored plurality of rows in response to the query.

20 Claims, 7 Drawing Sheets

(56) References Cited

U.S. PATENT DOCUMENTS

2021/0019284 A1\* 1/2021 Bowman ............... G06F 16/278
2022/0382758 A1\* 12/2022 Schreter .............. G06F 16/2282
2023/0418827 A1\* 12/2023 Kondiles ........... G06F 16/24542
2024/0004882 A1\* 1/2024 Bove ................ G06F 16/24544

\* cited by examiner

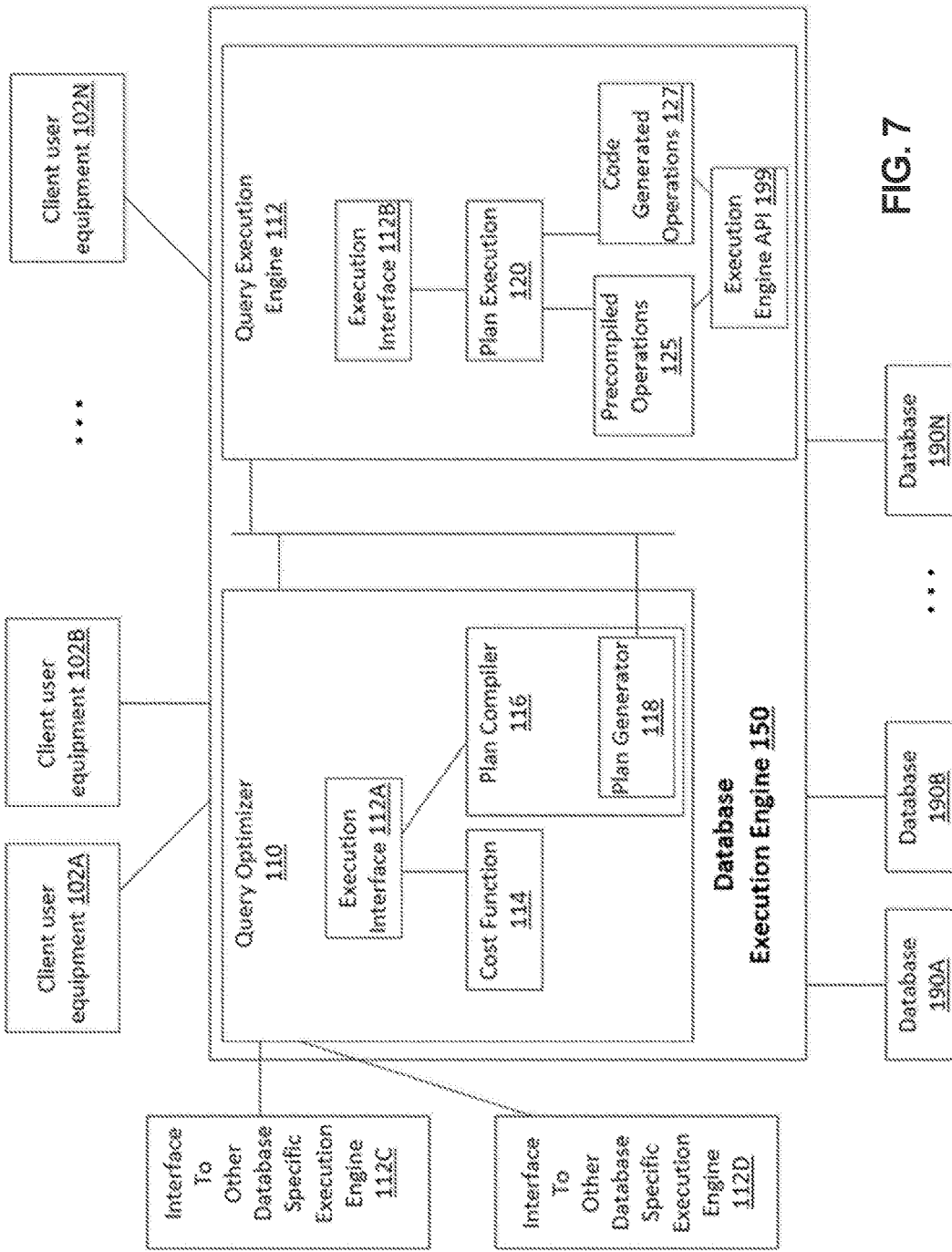

SPILL-TO-DISK IN PROJECTION OPERATIONS

TECHNICAL FIELD

The subject matter described herein relates generally to database management and more specifically to spill-to-disk in projection operations.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

Systems, methods, and articles of manufacture, including computer program products, are provided for spill-to-disk in projection operations. In one aspect, there is provided a system. The system may include at least one data processor and at least one memory. The at least one memory may store instructions that result in operations when executed by the at least one data processor. The operations may include: receiving a query including a projection. The operations further include receiving a plurality of rows in response to the query processed by a processing thread of a plurality of processing thread. The operations further include determining whether the query specifies an order for the plurality of rows. The operations further include in response to the query specifying the order, determining whether a disk buffer associated with the processing thread contains a stored row. The operations further include in response to determining the disk buffer contains the stored row, storing the plurality of rows in the disk buffer. The operations further include in response to determining the disk buffer does not contain the stored row and the memory buffer contains at least a threshold amount of memory to store the plurality of rows, storing the plurality of rows in a memory buffer associated with the processing thread. The operations further include providing the stored plurality of rows in response to the query.

A computer-implemented method may include: receiving a query including a projection. The method further includes receiving a plurality of rows in response to the query processed by a processing thread of a plurality of processing thread. The method further includes determining whether the query specifies an order for the plurality of rows. The method further includes in response to the query specifying the order, determining whether a disk buffer associated with the processing thread contains a stored row. The method further includes in response to determining the disk buffer contains the stored row, storing the plurality of rows in the disk buffer. The method further includes in response to determining the disk buffer does not contain the stored row and the memory buffer contains at least a threshold amount of memory to store the plurality of rows, storing the plurality of rows in a memory buffer associated with the processing thread. The method further includes providing the stored plurality of rows in response to the query.

A non-transitory computer-readable medium storing instructions, which when executed by at least one data processor, result in operations including: receiving a query including a projection. The operations further include receiving a plurality of rows in response to the query processed by a processing thread of a plurality of processing thread. The operations further include determining whether the query specifies an order for the plurality of rows. The operations further include in response to the query specifying the order, determining whether a disk buffer associated with the processing thread contains a stored row. The operations further include in response to determining the disk buffer contains the stored row, storing the plurality of rows in the disk buffer. The operations further include in response to determining the disk buffer does not contain the stored row and the memory buffer contains at least a threshold amount of memory to store the plurality of rows, storing the plurality of rows in a memory buffer associated with the processing thread. The operations further include providing the stored plurality of rows in response to the query.

In some variations of the methods, systems, and non-transitory computer readable media, one or more of the following features can optionally be included in any feasible combination.

In some variations, the disk buffer includes physical memory, and the memory buffer includes in-memory storage.

In some variations, the operations and/or method further include: in response to determining the query does not specify the order, determining whether the memory buffer contains the threshold amount of memory, and in response to determining the memory buffer contains the threshold amount of memory, storing the plurality of rows in the memory buffer.

In some variations, the operations and/or method further include: in response to determining the query does not specify the order, determining whether the memory buffer contains the threshold amount of memory, and in response to determining the memory buffer does not contain the threshold amount of memory, storing the plurality of rows in the disk buffer.

In some variations, the providing includes: consuming, by a fetching thread, the plurality of rows stored in the disk buffer and/or the memory buffer.

In some variations, the providing further includes: determining whether to consume the plurality of rows from the disk buffer prior to determining whether to consume the plurality of rows from the memory buffer when the query specifies the order for the plurality of rows.

In some variations, the providing further includes: determining whether to consume the plurality of rows from the memory buffer prior to determining whether to consume the plurality of rows from the disk buffer when the query specifies the order for the plurality of rows.

In some variations, a second processing thread of the plurality of processing threads stores a second plurality of rows in (a) a second disk buffer associated with the second processing thread in response to determining the second disk buffer contains a second stored row or (b) a second memory buffer associated with the second processing thread in response to determining the second disk buffer does not contain the second stored row and the second memory buffer contains at least a second threshold amount of memory to store the second plurality of rows.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7 depicts a block diagram for a database management system, in accordance with some example embodiments.

When practical, similar reference numbers denote similar structures, features, or elements.

DETAILED DESCRIPTION

Figure 1:
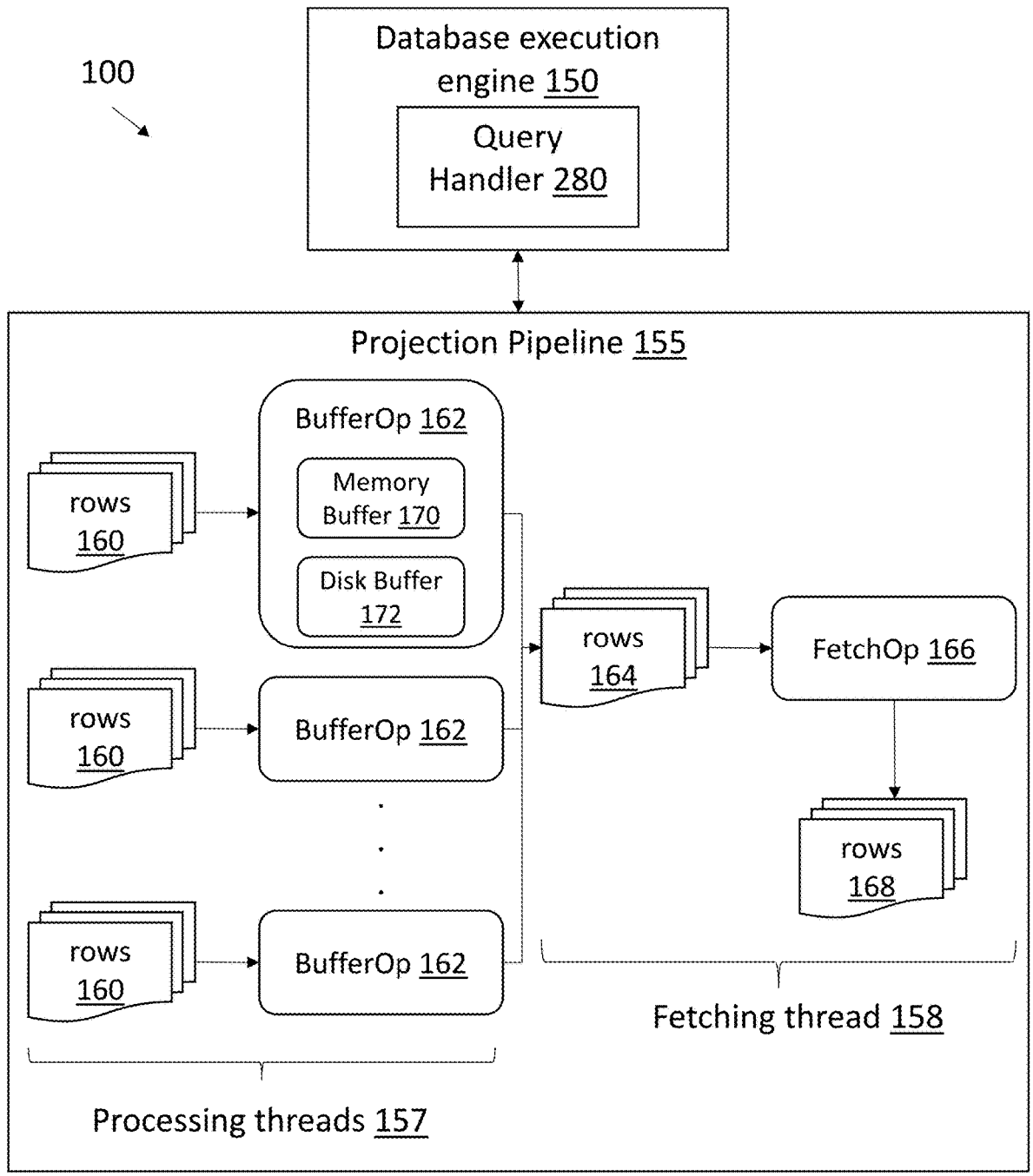
FIG. 1 depicts a system diagram illustrating a database management system, in accordance with some example embodiments.

Database management systems and operations performed on the data managed by a database management system have become increasingly complex. For example, a database management system (or database for short) can support relatively complex online analytical processing (OLAP, which can perform multi-dimensional analysis) to more straightforward transaction based online transaction processing (OLTP). Moreover, the database may be configured as a row-store database or column-store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query optimizer to determine an efficient way to execute the query plan.

Database management systems (including, for example, in-memory databases management systems and distributed database systems) can be used to store and manage a large amount of data. However, the database management systems may not have large enough memory to be able to store the data for processing during query execution (e.g., during implementation of the query execution plan). Such scenarios can be referred to herein as an out of memory (OOM) scenario. To prevent or handle such OOM scenarios, various mechanisms, such as result streaming and spill-to-disk, can be used. In particular, with spill-to-disk, a secondary memory (e.g., disk memory, solid state drive memory, etc.) can be leveraged when the database management systems fail to have sufficient memory. However, conventional techniques implementing spill-to-disk and result streaming are complex and unable to adequately and efficiently preserve the order of data, particularly during projection operations.

The database management system consistent with example embodiments of the current subject matter may efficiently determine whether to spill-to-disk based on the requests included in a query. Thus, the database management system described herein may prevent OOM scenarios, such as during execution of a projection, with minimal overhead on in-memory performance.

For example, the system may receive a plurality of rows in response to a query configured to be processed by a processing thread of a plurality of processing threads. The system may determine whether the query specifies an order for the plurality of rows, and handle the storage of the plurality of rows accordingly. In particular, based on determining the query specifies the order, the system, may store the plurality of rows in (a) a disk buffer associated with the processing thread when the disk buffer contains a stored row or (b) a memory buffer associated with the processing thread when the disk buffer does not contain the stored row and the memory buffer contains at least a threshold amount of memory to store the plurality of rows. Additionally and/or alternatively, based on determining the query does not specify the order, the system may store the plurality of rows in (a) the memory buffer associated with the processing thread when the memory buffer contains the threshold amount of memory, or (b) the disk buffer associated with the processing thread when the memory buffer does not contain at least the threshold amount of memory. The system may then provide the stored plurality of rows in response to the query. For example, the system may fetch the stored plurality of rows for consumption based on whether or not the query specifies the order. Accordingly, the described systems and methods provide a simple and efficient process for handling spill-to-disk scenarios, such as during projection operations.

FIG. 1 is a block diagram showing a projection pipeline 155 depicting an example query plan for execution by a database management system 100, in accordance with some example embodiments. The database management system 100 may include an execution engine 150 that may be configured to receive a query, generate a query plan (including for example query algebra), optimize the query plan, and/or generate executable code, as discussed herein, and discussed in more detail with respect to FIG. 7. The database management system 100 may also include a query handler 280 (which may be coupled to or form a part of the execution engine 150) that performs one more operations of a query, such as before or during execution of a query execution plan. The query handler 280 (which may comprise pre-compiled code and/or generated executable code) may define an application that is part of or separate from the execution engine 150 that handles processing of the query. Further, the query handler 280 may include or communicate with a plurality of processing threads for storing a plurality of rows and/or a fetching thread for fetching the stored plurality of rows for consumption and query plan execution.

Referring to FIG. 7, the database management system 100 may include databases 190A-N. The execution engine 150 may communicate with the databases 190A-N, such as via the query handler 280 of the execution engine 150 to store and retrieve a plurality of rows for use in executing a query. Consistent with implementations of the current subject matter, the query has a single projection as the root node. As used herein, the term "projection" refers to an operator (as part of the query plan, for example) at the top of the query (e.g., at the root node) which produces the query results in response to execution of the query.

The query can specify an order for the plurality of rows requested in the query. In other words, the query can include an ordered projection or an unordered projection. The ordering of the rows may occur outside of and/or before the projection performed by the projection operator. Thus, in an ordered projection, the order of the incoming rows is preserved for operation by the projection operator. The query includes the ordered projection when the query specifies an order for the requested rows or otherwise indicates that the order of the requested rows should be preserved. Additionally and/or alternatively, the query includes the unordered projection when the query does not specify an order for the requested rows or indicates that the order of the requested rows should not be preserved or otherwise does not need to be preserved.

Referring back to FIG. 1, as noted, the query handler 280 may communicate with and/or include one or more processing threads 157 (also referred to herein as "buffering threads") and a fetching thread 158. The query handler 280 may process a query received by the execution engine 150 using the one or more processing threads 157 and/or the fetching thread 158. The one or more processing threads 157 are located on the query execution (left) side of the projection pipeline 155, while the fetching thread 158 is positioned on the client (right) side of the projection pipeline 155. The term "thread" refers to unit(s) of processing instructions that are executed by, for example, an operating system, and allow application logic to be separated into several concurrent execution paths.

The fetching thread 158 may include a single thread for retrieving (e.g., consuming) one or more rows 164 from the one or more processing threads 157. In other embodiments, the fetching thread 158 can include more than one thread. As an example, the fetching thread 158 may retrieve rows 164 from multiple processing threads 157. The fetching thread 158 retrieves the rows 164 differently based on whether the query includes an ordered projection or an unordered projection. The process for retrieving rows is described in more detail with respect to at least FIG. 3. The fetching thread 158 may provide the retrieved rows 164 as rows 168. For example, the fetching thread 158 may provide the rows 168 in response to the query and/or for further processing during query plan execution.

The one or more processing threads 157 includes one, two, three, four, five, or more processing threads. The one or more processing threads 157 may operate concurrently. For example, the one or more processing threads 157 may buffer the requested rows in parallel. The one or more processing threads 157 may be used to efficiently store the rows referenced by the query based at least on whether the query includes an ordered projection or an unordered projection.

Each processing thread 157 of the one or more processing threads 157 may receive one or more rows 160 for processing (e.g., storing). Additionally, each processing thread 157 of the one or more processing threads 157 may be represented as or include a buffer operator (shown as "BufferOp") 162. The buffer operator 162 (e.g., the corresponding processing thread 157) includes an associated dedicated memory buffer 170 and an associated disk buffer 172. In other words, each buffer operator 162 (e.g., processing thread 157) may include its own memory buffer 170 and a disk buffer 172. The memory buffer 170 includes in-memory storage associated with the processing thread 157. The disk buffer 172 includes physical memory associated with the processing thread 157. For example, the disk buffer 172 may include disk memory, solid state drive memory, and/or the like. Additionally and/or alternatively, the disk buffer 172 includes a queue (e.g., a first in first out queue) of the rows of the data.

Generally, data (e.g., one or more rows) stored in-memory in the memory buffer 170 may be accessed faster than data stored in long term storage in the disk buffer 172. However, consistent with embodiments of the current subject matter, the disk buffer 172 provides efficient and thread-safe means to store rows in and/or load rows from disk (e.g., the disk buffer 172) in a single-producer-single-consumer scenario. As an example, a single producer, such as the one or more processing threads 157 (e.g., the buffer operators 162), may store rows in the disk buffer 172, while a single consumer, such as the fetching thread 158 (e.g., the fetch operator 166), concurrently consumes rows from the disk buffer 172. Thus, the first in first out order of the rows is preserved due to the synchronization between the one or more processing threads 157 and the fetching thread 158. Further, generally, when the buffer operator 162 (e.g., via the query handler 280) determines to spill-to-disk, the buffer operator 162 stores one or more rows in the disk buffer 172 rather than the memory buffer 170. Processes for storing and retrieving data from the disk buffer 172 are described in more detail below at least with respect to FIGS. 4 and 5.

The one or more processing threads 157 (e.g., the buffer operators 162) store the rows 160 differently based on whether the query includes an ordered projection or an unordered projection due at least in part to the order preservation requirements. For example, when the query includes the ordered projection (e.g., the query specifies the order of the requested data), the buffer operator 162 spills to its disk buffer 172 if there is already an existing row in the disk buffer 172 or when the memory buffer 170 of the corresponding buffer operator 162 contains at least a threshold amount (e.g., a predefined threshold, when the total number of rows to be stored is greater than the memory remaining in the memory buffer 170, when the total number of rows already stored in the memory buffer 170 is greater than the threshold, etc.) of memory to store the data. Thus, even if there is sufficient available memory in the memory buffer 170 for the corresponding buffer operator 162, the buffer operator 162 in this scenario would continue to store rows in the disk buffer 172 when the buffer operator 162 determines at least one row is already stored in the disk buffer 172 of the buffer operator 162. The buffer operator 162 may do so to maintain the order of the rows when an ordered projection is included in the query. Accordingly, the buffer operator 162 can efficiently, quickly, and simply store the requested data (e.g., rows) in response to a query while still preserving the order of the requested data.

When the query includes the unordered projection (e.g., the query does not specify the order of the requested data), the buffer operator 162 spills to its disk buffer 172 only when the memory buffer 170 of the corresponding buffer operator 162 does not have sufficient available memory to store the data. In other words, the buffer operator 162 spills to its disk buffer 172 in this scenario when the memory buffer 170 of the corresponding buffer operator 162 contains at least a threshold amount (e.g., a predefined threshold, when the total number of rows to be stored is greater than the memory remaining in the memory buffer 170, when the total number of rows already stored in the memory buffer 170 is greater than the threshold, etc.) of memory to store the data. The buffer operator 162 may do so to improve efficiency in storing the rows and fetching the stored rows when the query includes an unordered projection, since the buffer operator 162 store data (e.g., rows) in the memory buffer 170 and the fetching operator 166 fetches the stored data from the memory buffer 170 more efficiently and/or quickly than from the disk buffer 172 when the query includes an unordered projection. Accordingly, the buffer operator 162 can efficiently, quickly, and simply store the requested data (e.g., rows) in response to a query regardless of whether the query includes an ordered or unordered projection.

Figure 2:
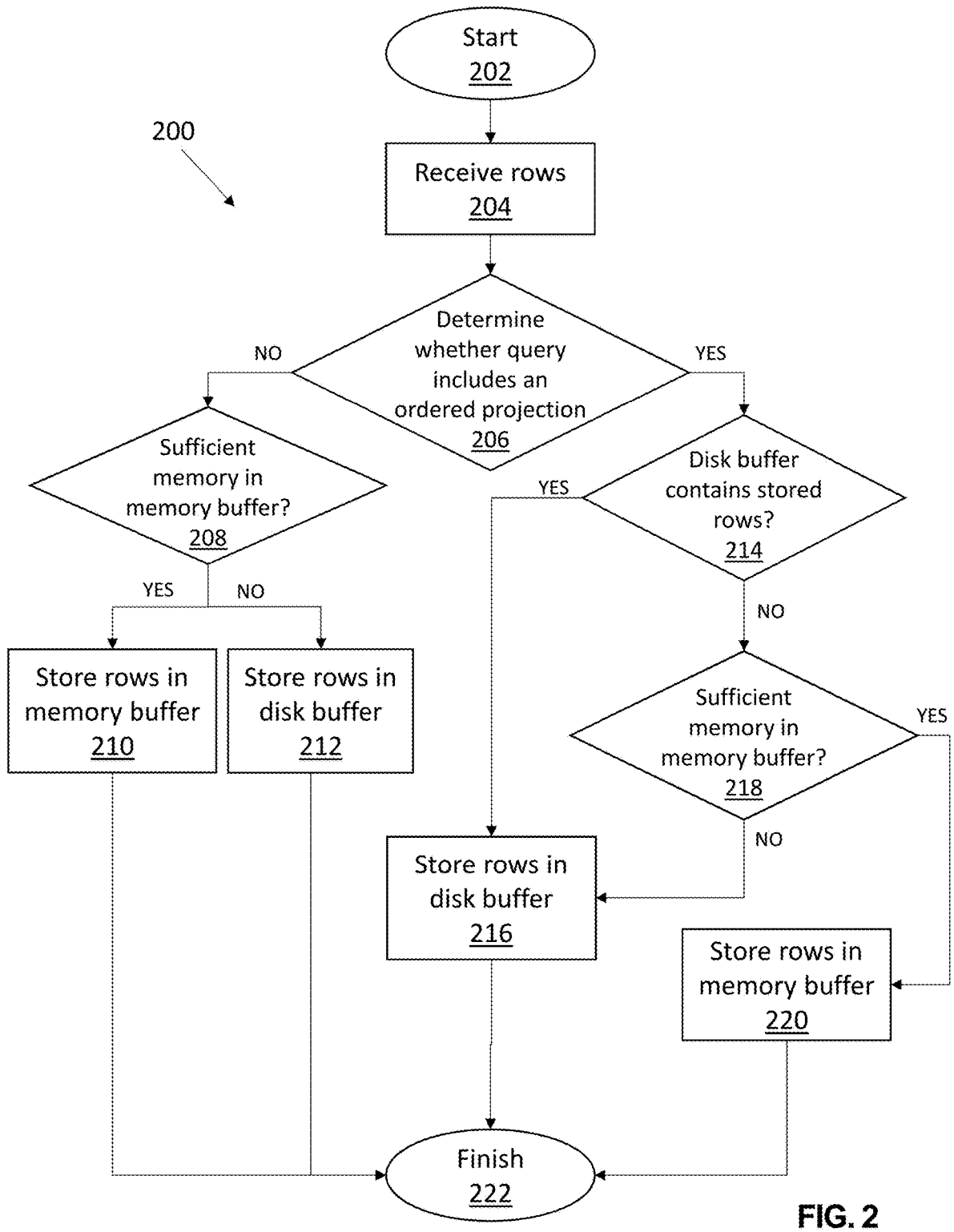
FIG. 2 depicts an example process for storing rows, in accordance with some example embodiments.

FIG. 2 illustrates an example process 200 for storing data (e.g., rows 160), in accordance with some example embodiments. The process 200 begins at 202. For example, the query handler 280 (e.g., execution engine 150) may receive a query. As noted, the query may include a projection. The query handler 280 (e.g., the execution engine 150) may begin the process 200 during execution of the query.

At 204, the one or more processing threads 157 (e.g., the buffer operator 162) may receive one or more rows (e.g., rows 160), such as via the query handler 280. The requested rows may be referenced by the query. The requested rows may include one or more attributes corresponding to one or more columns referenced by the query.

At 206, the one or more processing threads 157 may determine whether the query includes an ordered projection. In other words, the one or more processing threads 157 may determine whether the query specifies an order for the plurality of rows indicated in the query.

In some embodiments, the one or more processing threads 157 determines the query does not include an ordered projection. Alternatively, the one or more processing threads 157 determines the query includes an unordered projection. Based at least on determining the query does not include an ordered projection and/or includes an unordered projection, at 208, the one or more processing threads 157 determines whether the memory buffer 170 of the corresponding processing thread 157 contains sufficient memory (e.g., a threshold amount of memory). The threshold amount may be a predefined threshold. The threshold amount may correspond to a quantity of rows that can be stored by the memory buffer 170.

In some embodiments, a processing thread 157 of the one or more processing threads 157 compares the total number of rows to be stored to the memory (e.g., quantity of rows) remaining in the memory buffer 170. In this example, the processing thread 157 determines the memory buffer 170 contains a threshold amount of memory when the total quantity of rows to be stored is less than or equal to the memory remaining in the memory buffer 170. Additionally and/or alternatively, the processing thread 157 determines the memory buffer 170 does not contain the threshold amount of memory when the total quantity of rows to be stored is greater than the memory remaining in the memory buffer 170.

In some embodiments, the processing thread of the one or more processing threads 157 compares the total quantity of rows already stored in the memory buffer 170 to a threshold (e.g., predefined threshold) quantity of rows. The threshold quantity of rows may correspond to a maximum quantity of rows that can be stored in the memory buffer 170. In this example, the processing thread 157 determines the memory buffer 170 contains the threshold amount of memory when the total quantity of rows already stored in the memory buffer 170 is less than or equal to the threshold quantity of rows. Additionally and/or alternatively, the processing thread 157 determines the memory buffer 170 does not contain the threshold amount of memory when the total quantity of rows already stored in the memory buffer 170 is greater than the threshold quantity of rows. It should be appreciated that other methods for determining whether there is sufficient memory in the memory buffer 170 are contemplated.

At 210, the processing thread 157 stores the rows in the memory buffer 170 associated with the processing thread 157 when the processing thread 157 determines the memory buffer 170 associated with the processing thread 157 contains sufficient memory. Alternatively, at 212, the processing thread 157 stores the rows in the disk buffer 172 associated with the processing thread 157 when the processing thread 157 determines the memory buffer 170 associated with the processing thread 157 does not contain sufficient (e.g., at least the threshold amount) memory. Thus, the processing thread 157 spills-to-disk when the processing thread 157 determines the memory buffer 170 associated with the processing thread 157 does not contain sufficient memory.

Referring again to FIG. 2, in some embodiments, the one or more processing threads 157 determines the query includes an ordered projection. This means that the query specifies an order of the requested rows. Based at least on determining the query includes an ordered projection, at 214, each processing thread 157 handling the storing of the rows determines whether the disk buffer 172 associated with the processing thread 157 contains a stored row.

In some embodiments, the processing thread 157 determines the disk buffer 172 already contains a stored row. Based at least on the processing thread 157 determines its disk buffer 172 already contains the stored row, at 216, the processing thread 157 stores the requested rows being handled by the processing thread 157 in the disk buffer 172 of that processing thread 157, and completes the process at 222. Doing so provides an efficient process for storing and fetching rows while preserving the order of such rows when the query includes an ordered projection.

In other embodiments, the processing thread 157 determines the disk buffer 172 does not already contain the stored row. Based at least on determining the disk buffer 172 associated with the processing thread 157 does not already contain the stored row, at 218, the processing thread determines whether the memory buffer 170 associated with the processing thread 157 contains sufficient memory (e.g., a threshold amount of memory). The threshold amount may be a predefined threshold. The threshold amount may correspond to a quantity of rows that can be stored by the memory buffer 170.

In some embodiments, the processing thread 157 compares the total number of rows to be stored to the memory (e.g., quantity of rows) remaining in the memory buffer 170. In this example, the processing thread 157 determines the memory buffer 170 contains a threshold amount of memory when the total quantity of rows to be stored is less than or equal to the memory remaining in the memory buffer 170. Additionally and/or alternatively, the processing thread 157 determines the memory buffer 170 does not contain the threshold amount of memory when the total quantity of rows to be stored is greater than the memory remaining in the memory buffer 170.

In some embodiments, the processing thread of the one or more processing threads 157 compares the total quantity of rows already stored in the memory buffer 170 to a threshold (e.g., predefined threshold) quantity of rows. The threshold quantity of rows may correspond to a maximum quantity of rows that can be stored in the memory buffer 170. In this example, the processing thread 157 determines the memory buffer 170 contains the threshold amount of memory when the total quantity of rows already stored in the memory buffer 170 is less than or equal to the threshold quantity of rows. Additionally and/or alternatively, the processing thread 157 determines the memory buffer 170 does not contain the threshold amount of memory when the total quantity of rows already stored in the memory buffer 170 is greater than the threshold quantity of rows. It should be appreciated that other methods for determining whether there is sufficient memory in the memory buffer 170 are contemplated.

Thus, the processing thread 157 may determine the memory buffer 170 contains sufficient memory. Alternatively, the processing thread 157 may determine the memory buffer 170 does not contain sufficient memory. At 220, the processing thread 157 stores the rows in the memory buffer 170 associated with the processing thread 157 when the processing thread 157 determines the memory buffer 170 associated with the processing thread 157 contains sufficient memory. Alternatively, at 216, the processing thread 157 stores the rows in the disk buffer 172 associated with the processing thread 157 when the processing thread 157 determines the memory buffer 170 associated with the processing thread 157 does not contain sufficient (e.g., at least the threshold amount) memory. Thus, the processing thread 157 spills-to-disk when the processing thread 157 determines the disk buffer 172 already contains a stored row or the disk buffer 172 does not already contain the stored row and the memory buffer 170 does not contain sufficient memory.

Each of the one or more processing threads 157 may store rows from the rows requested in the query in parallel (e.g., concurrently) in the respective memory buffers 170 or disk buffers 172 using process 200. At 222, the process 200 may be completed.

Figure 3:
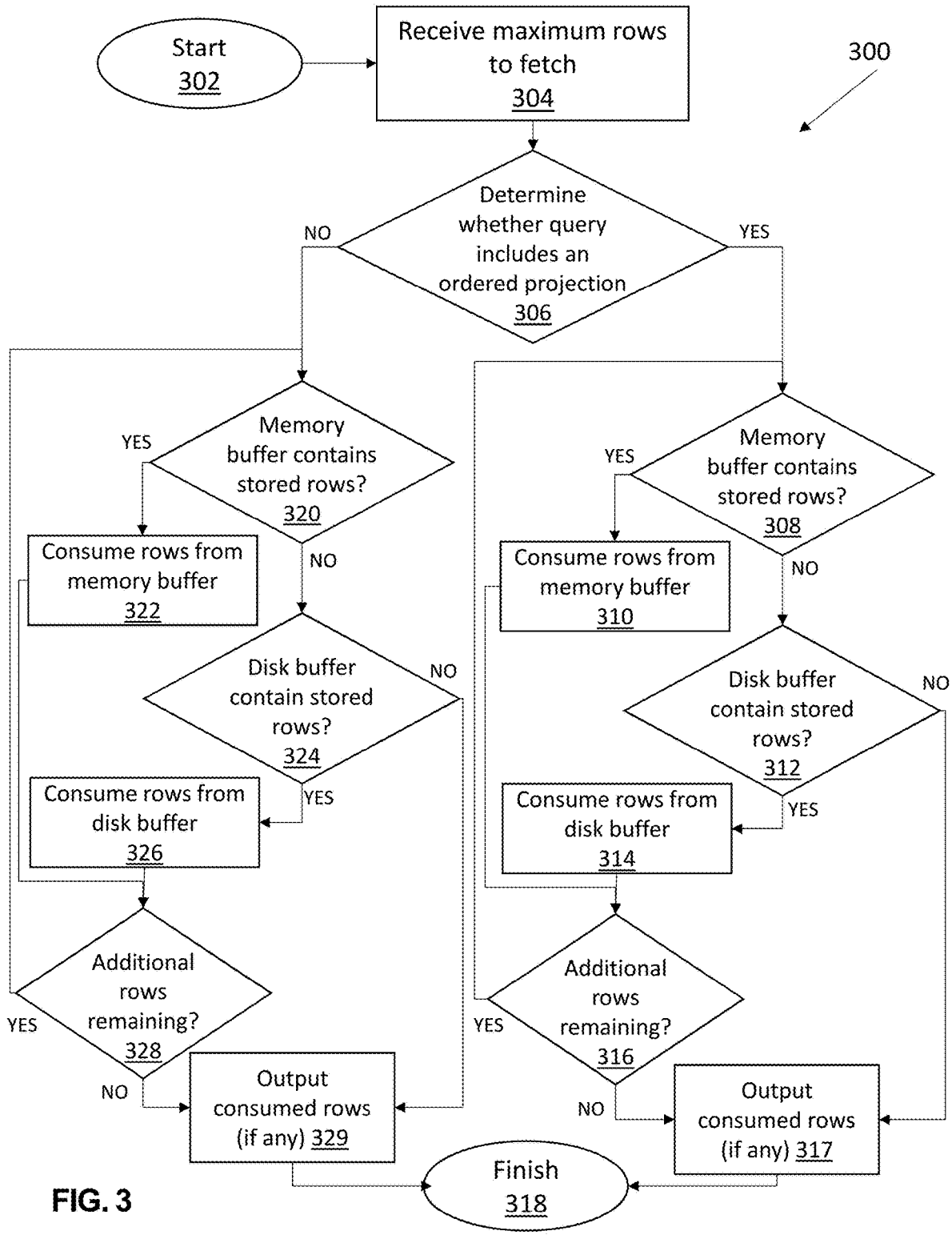
FIG. 3 depicts an example process for retrieving rows, in accordance with some example embodiments.

FIG. 3 depicts an example process 300 for retrieving rows (e.g., the rows 160 as rows 164), in accordance with some example embodiments. For example, the fetching thread 158 (e.g., fetch operator 166) may retrieve (e.g., consume) the rows stored by each of the one or more processing threads 157. As noted herein, the fetching thread 158 retrieves the rows (e.g., data) differently based on whether the query includes an ordered projection or an unordered projection. When the query includes an unordered projection, the fetching thread 158 first attempts to fetch the data from the memory buffer 170 of the one or more processing threads 157 before attempting (if needed) to fetch the data from the disk buffer 172 of the one or more processing threads 157. Additionally and/or alternatively, when the query includes an ordered projection, the fetching thread 158 first attempts to fetch the data from the disk buffer 172 of the one or more processing threads 157 before attempting (if needed) to fetch the data from the memory buffer 170 of the one or more processing threads 157.

The process 300 begins at 302. For example, the query handler 280 (e.g., execution engine 150) may execute the query plan according to the query.

At 304, the fetching thread 158 (e.g., the fetch operator 166) may retrieve one or more rows (e.g., a maximum quantity of rows 164), such as via the query handler 280 from the memory buffer 170 and/or the disk buffer 172 of the one or more processing threads 157. The requested rows may be referenced by the query. The requested rows may include one or more attributes corresponding to one or more columns referenced by the query.

At 306, the fetching thread 158 may determine whether the query includes an ordered projection. In other words, the fetching thread 158 may determine whether the query specifies an order for the plurality of rows indicated in the query.

In some embodiments, the fetching thread 158 determines the query includes an unordered projection. Based at least on determining the query includes an unordered projection, at 320, the fetching thread 158 determines whether the memory buffer 170 of at least one associated with the processing threads 157 contains at least one stored row.

As an example, the fetching thread 158 may determine the memory buffer 170 of a processing thread 157 contains at least one stored row. Based on determining the memory buffer 170 associated with the processing thread 157 contains at least one stored row, at 322, the fetching thread 158 consumes rows from the memory buffer 170. At 328, the fetching thread 158 determines whether additional rows remain to be consumed (e.g., retrieved from the one or more processing threads 157). Based at least on determining additional rows remain to be consumed, the fetching thread 158 returns to step 320. Based at least on determining additional rows do not remain to be consumed (e.g., there are no rows remaining to be retrieved), the fetching thread 158 outputs the consumed rows, at 329, in response to the query (e.g., as part of and/or for use during query execution) and completes the process 300, at 318.

As another example, the fetching thread 158 may determine the memory buffer 170 of at least one associated with the processing threads 157 does not contain at least one stored row. Based at least on determining the memory buffer 170 of at least one associated with the processing threads 157 does not contain at least one stored row, at 324, the fetching thread 158 determines whether the disk buffer 172 associated with the processing thread 157 contains at least one stored row.

The fetching thread 158 may determine the disk buffer 172 associated with the processing thread 157 contains at least one stored row. Based on determining the disk buffer 172 associated with the processing thread 157 contains at least one stored row, at 326, the fetching thread 158 consumes rows from the disk buffer 172. At 328, the fetching thread 158 determines whether additional rows remain to be consumed (e.g., retrieved from the one or more processing threads 157). Based at least on determining additional rows remain to be consumed, the fetching thread 158 returns to step 320. Based at least on determining additional rows do not remain to be consumed (e.g., there are no rows remaining to be retrieved), the fetching thread 158 outputs the consumed rows, at 329, in response to the query (e.g., as part of and/or for use during query execution) and completes the process 300, at 318.

Additionally and/or alternatively, the fetching thread 158 may determine the disk buffer 172 associated with the processing thread 157 does not contain at least one stored row. Based at least on determining the disk buffer 172 does not contain at least one stored row, the fetching thread 158 outputs the consumed rows, at 329, in response to the query (e.g., as part of and/or for use during query execution) and completes the process 300, at 318. The fetching thread 158 may complete this process (e.g., including steps 320, 322, 324, 326, 328, 329, etc.) for each of the one or more processing threads 157 in parallel, in sequence, concurrently, and/or the like.

Referring back to FIG. 3, in some embodiments, the fetching thread 158 determines the query includes an ordered projection (e.g., the query specifies an order for the referenced rows). Based at least on determining the query includes an ordered projection, at 308, the fetching thread 158 determines whether the memory buffer 170 of at least one associated with the processing threads 157 contains at least one stored row.

As an example, the fetching thread 158 may determine the memory buffer 170 of a processing thread 157 contains at least one stored row. Based on determining the memory buffer 170 associated with the processing thread 157 contains at least one stored row, at 310, the fetching thread 158 consumes rows from the memory buffer 170. At 316, the fetching thread 158 determines whether additional rows remain to be consumed (e.g., retrieved from the one or more processing threads 157). Based at least on determining additional rows remain to be consumed, the fetching thread 158 returns to step 308. Based at least on determining additional rows do not remain to be consumed (e.g., there are no rows remaining to be retrieved), the fetching thread 158 outputs the consumed rows, at 317, in response to the query (e.g., as part of and/or for use during query execution) and completes the process 300, at 318.

As another example, the fetching thread 158 may determine the memory buffer 170 of at least one associated with the processing threads 157 does not contain at least one stored row. Based at least on determining the memory buffer 170 of at least one associated with the processing threads 157 does not contain at least one stored row, at 312, the fetching thread 158 determines whether the disk buffer 172 associated with the processing thread 157 contains at least one stored row.

The fetching thread 158 may determine the disk buffer 172 associated with the processing thread 157 contains at least one stored row. Based on determining the disk buffer 172 associated with the processing thread 157 contains at least one stored row, at 314, the fetching thread 158 consumes rows from the disk buffer 172. At 316, the fetching thread 158 determines whether additional rows remain to be consumed (e.g., retrieved from the one or more processing threads 157). Based at least on determining additional rows remain to be consumed, the fetching thread 158 returns to step 308. Based at least on determining additional rows do not remain to be consumed (e.g., there are no rows remaining to be retrieved), the fetching thread 158 outputs the consumed rows, at 317, in response to the query (e.g., as part of and/or for use during query execution) and completes the process 300, at 318.

Additionally and/or alternatively, the fetching thread 158 may determine, at 312, the disk buffer 172 associated with the processing thread 157 does not contain at least one stored row. Based at least on determining the disk buffer 172 does not contain at least one stored row, the fetching thread 158 outputs the consumed rows, at 317, in response to the query (e.g., as part of and/or for use during query execution) and completes the process 300, at 318. The fetching thread 158 may complete this process (e.g., including steps 308, 310, 312, 314, 316, 317, etc.) for each of the one or more processing threads 157 in parallel, in sequence, concurrently, and/or the like.

Figure 4:
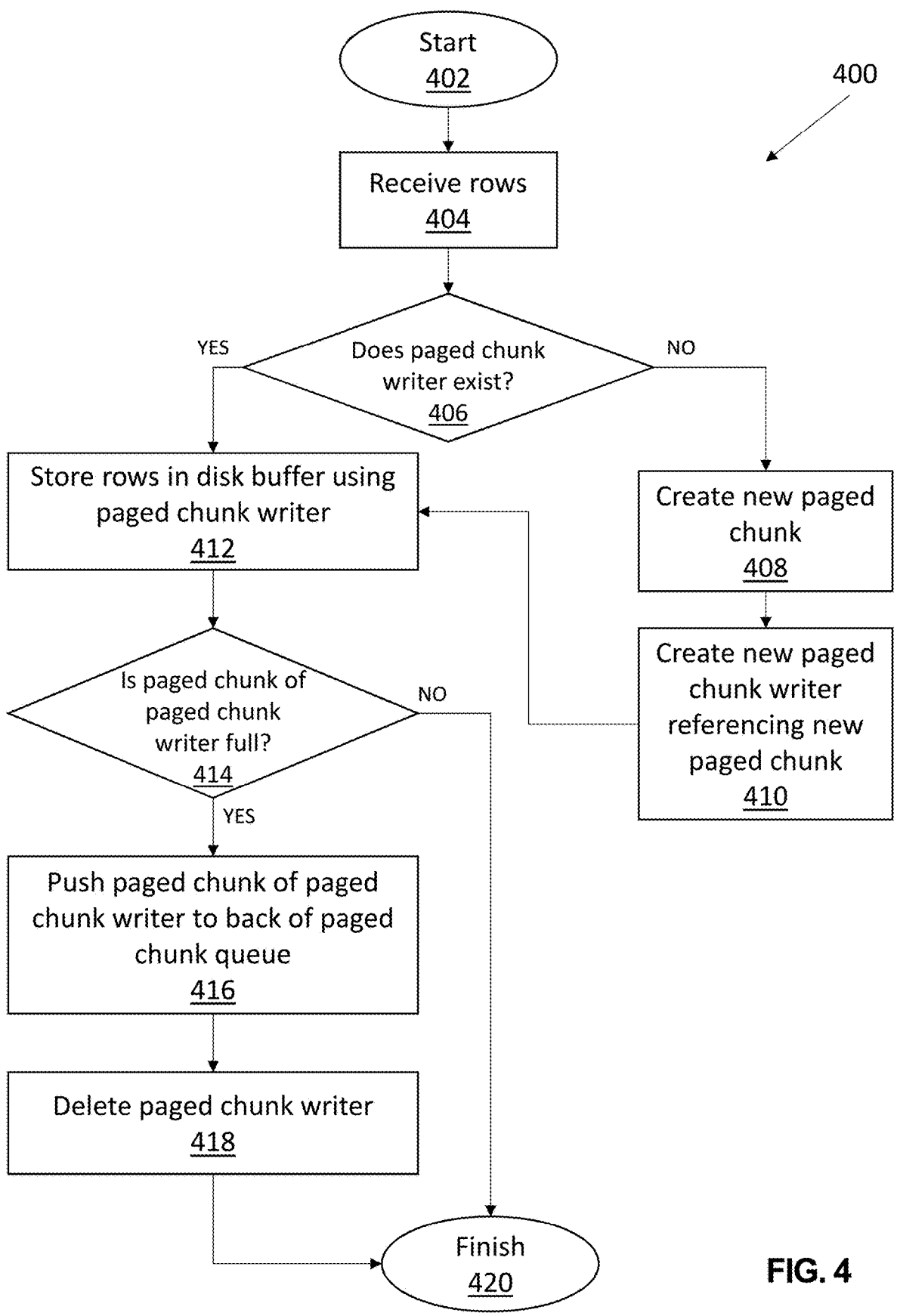
FIG. 4 depicts an example process for storing rows in a disk buffer of a processing thread, in accordance with some example embodiments.

FIG. 4 depicts an example process 400 for storing rows in a disk buffer (e.g., the disk buffer 172) of a processing thread 157 (e.g., the buffer operator 162), in accordance with some example embodiments. Generally, the processing thread 157 stores rows (e.g., data) in the disk buffer 172 inside paged chunks and manages a first in first out queue of paged chunks. A paged chunk is a page of the disk buffer 172 that stores rows (e.g., the data) in one or more pages that reside in secondary memory. Each paged chunk of the disk buffer 172 is filled with rows until the quantity of rows meets (e.g., is greater than) a threshold quantity (e.g., a predefined threshold).

The rows may be written to the paged chunks of the disk buffer 172 via a paged chunk writer and read from the paged chunks of the disk buffer 172 via a paged chunk reader. The paged chunk writer and the paged chunk reader may be application programming interfaces (APIs) that can communicate with the paged chunks of the disk buffer 172 and/or perform one or more operations with respect to storing and/or reading data from the paged chunks of the disk buffer 172. Generally, the paged chunk reader cannot read from a paged chunk at the same time as a paged chunk writer is writing to the paged chunk. Also, a paged chunk may generally have either a single active paged chunk writer or multiple active paged chunk readers. Additionally and/or alternatively, the disk buffer 172 may have one paged chunk writer and one paged chunk reader, although other configurations are contemplated in which the disk buffer 172 has one or more paged chunk writers and/or one or more paged chunk readers.

Referring to FIG. 4, at 402, the buffer operator 162 (e.g., the processing thread 157) begins the process 400 to write one or more rows to one or more paged chunks of the disk buffer 172 when the processing thread 157 determines to store one or more rows in the disk buffer 172 of the corresponding processing thread 157. At 404, the processing thread 157 receives the rows for storing in the disk buffer 172. The rows may include the rows 160 referenced by the query.

At 406, the processing thread 157 determines whether a paged chunk writer corresponding to the disk buffer 172 exists. Based at least on the processing thread 157 determining the paged chunk writer for the particular disk buffer 172 exists, at 412, the processing thread 157 stores one or more rows in the disk buffer 172 using the paged chunk writer. Additionally and/or alternatively, based at least on the processing thread 157 determining the paged chunk writer for the particular disk buffer 172 does not exist, at 408, the processing thread 157 creates a new paged chunk. The processing thread 157 may add the new paged chunk to the queue of paged chunks managed by the processing thread 157 for the disk buffer 172. At 410, the processing thread 157 may also create a new paged chunk writer referencing the new paged chunk, and, at 412, the processing thread 157 stores one or more rows in the disk buffer 172 using the new paged chunk writer.

At 414, the processing thread 157 determines whether the paged chunk (or the newly created paged chunk) corresponding to the paged chunk writer is full. The processing thread 157 determines the paged chunk is full when the paged chunk contains a quantity of rows that is greater than or equal to a threshold quantity (e.g., a predefined quantity). Based at least on the processing thread 157 determining the paged chunk is not full (e.g., when the paged chunk contains a quantity of rows that is less than the threshold quantity), at 420, the processing thread 157 ends the process 400. Additionally and/or alternatively, based at least on the processing thread 157 determining the paged chunk is full (e.g., when the paged chunk contains a quantity of rows that is greater than or equal to the threshold quantity), at 416, the processing thread 157 pushes the paged chunk to the back of the paged chunk queue, and at 418, the processing thread 157 deletes the paged chunk writer, before completing the process 400 at 420.

Figure 5:
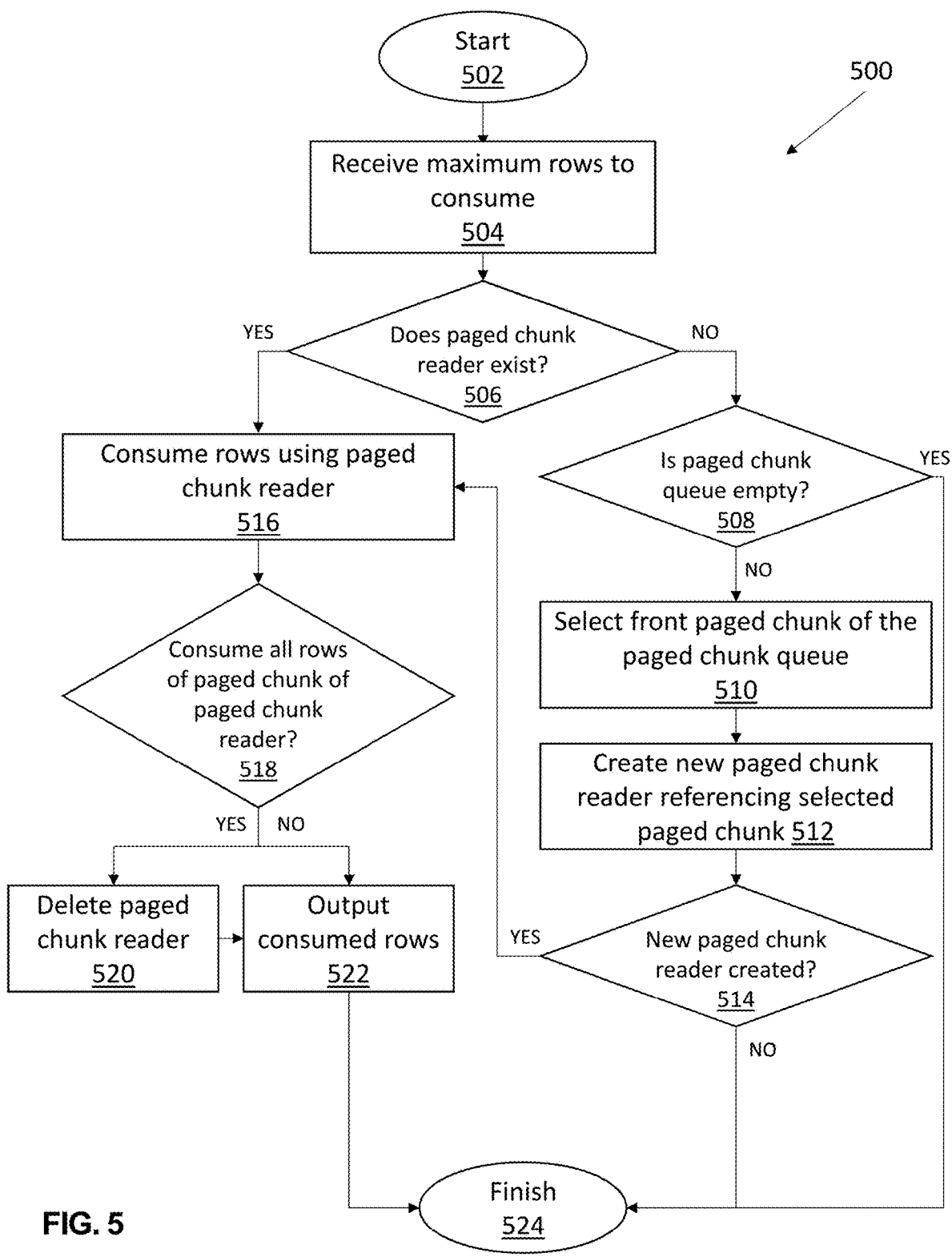
FIG. 5 depicts an example process for consuming rows from a disk buffer of a processing thread, in accordance with some example embodiments.

FIG. 5 depicts an example process 500 for consuming rows from a disk buffer (e.g., the disk buffer 172) of a processing thread 157 (e.g., the buffer operator 162), in accordance with some example embodiments. Referring to FIG. 5, at 502, the fetch operator 166 (e.g., the fetching thread 158) begins the process 500 to retrieve (e.g., consume) one or more rows from the one or more paged chunks of the disk buffer 172, such as when one or more rows have been stored in the disk buffer 172 of a processing thread 157. At 504, the fetching thread 158 receives the maximum rows for consuming from the disk buffer 172. The rows may include the maximum quantity of rows 164 from one or more associated with the processing threads 157.

At 506, the fetching thread 158 determines whether a paged chunk reader corresponding to the disk buffer 172 exists. If the fetching thread 158 determines the paged chunk reader does not exist, the fetching thread 158 may attempt to create a new paged chunk reader. If the paged chunk queue is empty, the attempt fails, and no rows are read from the disk buffer 172. In other words, based at least on the fetching thread 158 determining the paged chunk reader for the particular disk buffer 172 does not exist, at 508, the fetching thread 158 determines whether the paged chunk queue is empty. If the paged chunk queue is empty, the attempt fails, and the process 500 ends at 524, without reading rows from the disk buffer 172. In some implementations, when creating a new paged chunk reader, if the paged chunk queue is empty, the fetching thread 158 creates the new paged chunk reader pointing to a current paged chunk being written (if any). In other words, the fetching thread 158 creates the new paged chunk reader pointing to a current paged chunk that contains rows but is not yet full, and begins consuming it for reading.

Additionally and/or alternatively, based on determining the paged chunk queue is not empty, at 510, the fetching thread 158 selects the front paged chunk of the paged chunk queue and, at 512, the fetching thread 158 creates a new paged chunk reader referencing the selected paged chunk. At 514, the fetching thread 158 determines whether the new paged chunk reader was successfully created. If not, the process 500 ends at 524. Based at least on determining a new paged chunk reader was created, at 516, the fetching thread 158 consumes rows from the selected paged chunk using the new paged chunk reader.

Referring again to FIG. 5, based at least on the fetching thread 158 determining the paged chunk reader for the particular disk buffer 172 exists, at 516, the fetching thread 158 additionally and/or alternatively consumes one or more rows from the paged chunk(s) of the disk buffer 172 using the paged chunk reader.

At 518, the fetching thread 158 determines whether all rows of the paged chunk corresponding to the existing paged chunk reader and/or the newly created paged chunk reader have been consumed. Based at least on determining all rows of the paged chunk corresponding to the existing paged chunk reader and/or the newly created paged chunk reader have been consumed, at 520, the fetching thread 158 deletes the paged chunk reader, and outputs the consumed rows, at 522, before completing the process 500, at 524. Additionally and/or alternatively, based at least on determining all rows of the paged chunk corresponding to the existing paged chunk reader and/or the newly created paged chunk reader have not been consumed, at 522, the fetching thread 158 outputs the consumed rows before completing the process 500, at 524.

Figure 6:
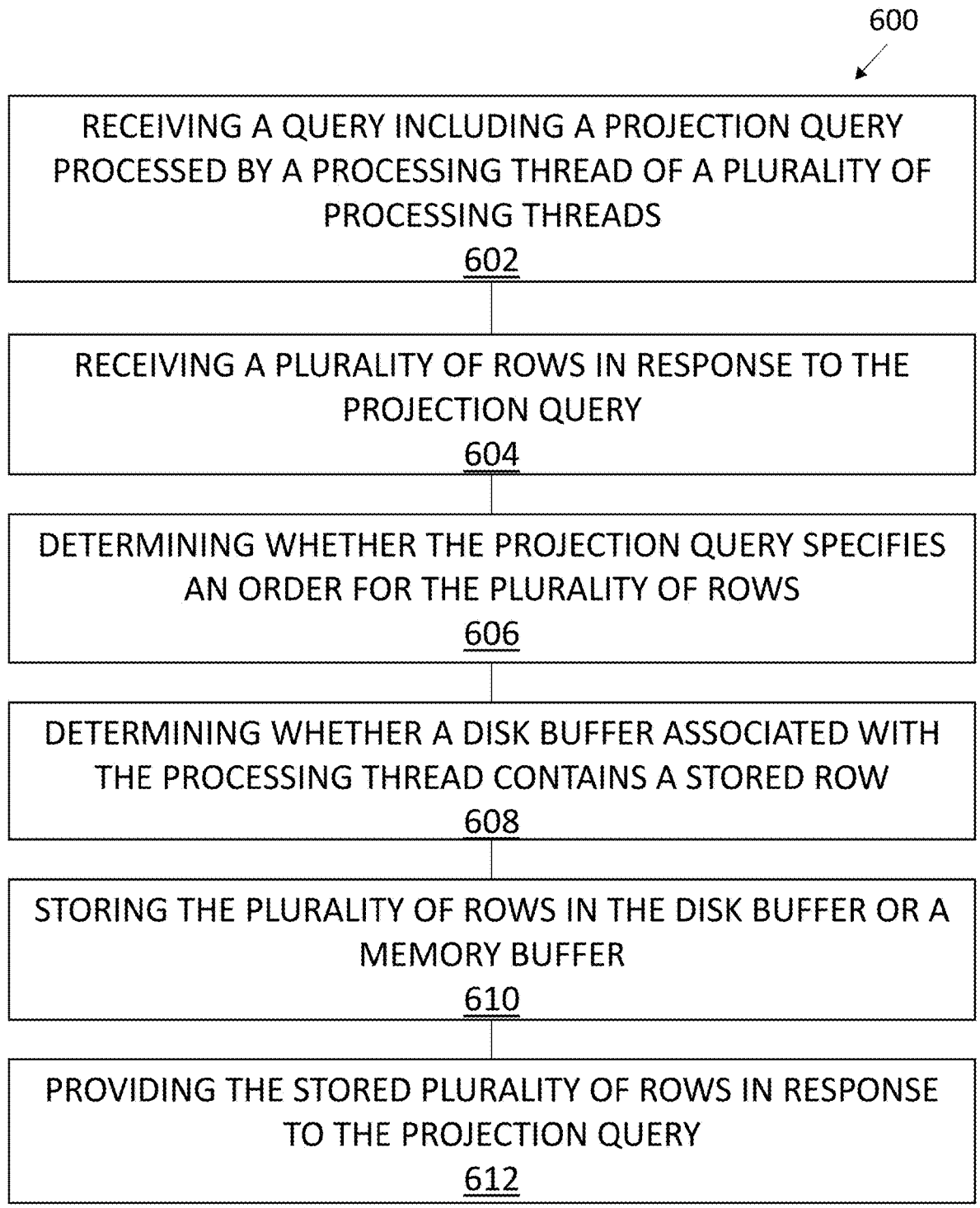
FIG. 6 depicts an example flowchart illustrating a process for executing a query, in accordance with some example embodiments.

FIG. 6 depicts an example flowchart illustrating a process 600 for executing a query, in accordance with some example embodiments. Referring to FIGS. 1-6, one or more aspects of the process 600 may be performed by the query handler 280, the execution engine 150, the processing thread 157, the fetching thread 158, and/or another component of the database management system 100. As described herein, the database management system 100 helps to efficiently execute a query, such as when the query includes a projection.

At 602, the database management system 100 receives a query. The query may include a projection (e.g., as a root node of the query). The query may be processed by a processing thread (e.g., the processing thread 157) of a plurality of processing threads. The query may be executed during execution of a query plan, such as by the execution engine 150.

At 604, the database management system 100 receives a plurality of rows in response to the query. For example, the query may reference the plurality of rows. The database management system 100 may receive the plurality of rows during execution of the query.

At 606, the database management system 100 determines whether the query specifies an order for the plurality of rows. The query specifies the order for the plurality of rows when the query includes an ordered projection. The projection query may not specify the order for the plurality of rows when the projection does not include the ordered projection or includes an unordered projection.

At 608, the database management system 100 determines whether a disk buffer (e.g., the disk buffer 172) associated with the processing thread contains a stored row in response to the query specifying the order. For example, the database management system 100 checks the disk buffer to determine whether the disk buffer already contains any stored rows. In some embodiments, the disk buffer may include physical memory. The disk buffer may be associated with a particular processing thread.

At 610, the database management system 100 stores the plurality of rows in the disk buffer or the memory buffer. The database management system 100 stores the plurality of rows in the disk buffer in response to determining the disk buffer contains the stored row. The database management system 100 stores the plurality of rows in the memory buffer (e.g., the memory buffer 170) associated with the processing thread in response to determining the disk buffer does not contain the stored row and the memory buffer contains at least a threshold amount (e.g., a predefined threshold) of memory to store the plurality of rows. In some embodiments, the memory buffer includes in-memory storage. The disk buffer and/or the memory buffer may be associated with a particular processing thread.

In some embodiments, a second processing thread of the plurality of processing threads checks a second disk buffer associated with the second processing thread to determine whether the disk buffer contains a second stored row. The second processing thread stores a second plurality of rows in (a) the second disk buffer in response to determining the second disk buffer contains the second stored row or (b) a second memory buffer associated with the second processing thread in response to determining the second disk buffer does not contain the second stored row and the second memory buffer contains at least a second threshold amount of memory to store the second plurality of rows, and so on.

Additionally and/or alternatively, the database management system 100 determines the query does not specify the order of the plurality of rows. In response to determining the query does not specify the order, the database management system 100 may determine whether the memory buffer contains the threshold amount of memory. In response to determining the memory buffer contains the threshold amount of memory, the database management system 100 stores the plurality of rows in the memory buffer. In response to determining the memory buffer does not contain the threshold amount of memory, the database management system 100 stores the plurality of rows in the disk buffer.

At 612, the database management system 100 may provide the stored plurality of rows in response to the query. In some embodiments, the consumed plurality of rows may be provided for executing the query and/or for further processing and/or execution of the query plan.

In some embodiments, providing the stored plurality of rows includes consuming, by a fetching thread (e.g., the fetching thread 158), the plurality of rows stored in the disk buffer and/or the memory buffer. In some embodiments, the providing also includes determining whether to consume the plurality of rows from the disk buffer prior to determining whether to consume the plurality of rows from the memory buffer when the query specifies the order for the plurality of rows and/or determining whether to consume the plurality of rows from the memory buffer prior to determining whether to consume the plurality of rows from the disk buffer when the query specifies the order for the plurality of rows.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory result in operations comprising: receiving a query including a projection; receiving a plurality of rows in response to the query processed by a processing thread of a plurality of processing threads; determining whether the query specifies an order for the plurality of rows; in response to the query specifying the order, determining whether a disk buffer associated with the processing thread contains a stored row; in response to determining the disk buffer contains the stored row, storing the plurality of rows in the disk buffer; in response to determining the disk buffer does not contain the stored row and the memory buffer contains at least a threshold amount of memory to store the plurality of rows, storing the plurality of rows in a memory buffer associated with the processing thread; and providing the stored plurality of rows in response to the query.

Example 2: The system of Example 1, wherein the disk buffer includes physical memory, and wherein the memory buffer includes in-memory storage.

Example 3: The system of any one of Examples 1 to 2, wherein the operations further comprise: in response to determining the query does not specify the order, determining whether the memory buffer contains the threshold amount of memory; and in response to determining the memory buffer contains the threshold amount of memory, storing the plurality of rows in the memory buffer.

Example 4: The system of any one of Examples 1 to 3, wherein the operations further comprise: in response to determining the query does not specify the order, determining whether the memory buffer contains the threshold amount of memory; and in response to determining the memory buffer does not contain the threshold amount of memory, storing the plurality of rows in the disk buffer.

Example 5: The system of any one of Examples 1 to 4, wherein the providing comprises: consuming, by a fetching thread, the plurality of rows stored in the disk buffer and/or the memory buffer.

Example 6: The system of any one of Examples 1 to 5, wherein the providing further comprises: determining whether to consume the plurality of rows from the disk buffer prior to determining whether to consume the plurality of rows from the memory buffer when the query specifies the order for the plurality of rows.

Example 7: The system of any one of Examples 1 to 6, wherein the providing further comprises: determining whether to consume the plurality of rows from the memory buffer prior to determining whether to consume the plurality of rows from the disk buffer when the query specifies the order for the plurality of rows.

Example 8: The system of any one of Examples 1 to 7, wherein a second processing thread of the plurality of processing threads stores a second plurality of rows in (a) a second disk buffer associated with the second processing thread in response to determining the second disk buffer contains a second stored row or (b) a second memory buffer associated with the second processing thread in response to determining the second disk buffer does not contain the second stored row and the second memory buffer contains at least a second threshold amount of memory to store the second plurality of rows.

Example 9: A computer-implemented method, comprising: receiving a query including a projection; receiving a plurality of rows in response to the query processed by a processing thread of a plurality of processing threads; determining whether the query specifies an order for the plurality of rows; in response to the query specifying the order, determining whether a disk buffer associated with the processing thread contains a stored row; in response to determining the disk buffer contains the stored row, storing the plurality of rows in the disk buffer; in response to determining the disk buffer does not contain the stored row and the memory buffer contains at least a threshold amount of memory to store the plurality of rows, storing the plurality of rows in a memory buffer associated with the processing thread; and providing the stored plurality of rows in response to the query.

Example 10: The method of Example 9, wherein the disk buffer includes physical memory, and wherein the memory buffer includes in-memory storage.

Example 11: The method of any one of Examples 9 to 10, wherein the operations further comprise: in response to determining the query does not specify the order, determining whether the memory buffer contains the threshold amount of memory; and in response to determining the memory buffer contains the threshold amount of memory, storing the plurality of rows in the memory buffer.

Example 12: The method of any one of Examples 9 to 11, wherein the operations further comprise: in response to determining the query does not specify the order, determining whether the memory buffer contains the threshold amount of memory; and in response to determining the memory buffer does not contain the threshold amount of memory, storing the plurality of rows in the disk buffer.

Example 13: The method of any one of Examples 9 to 12, wherein the providing comprises: consuming, by a fetching thread, the plurality of rows stored in the disk buffer and/or the memory buffer.

Example 14: The method of any one of Examples 9 to 13, wherein the providing further comprises: determining whether to consume the plurality of rows from the disk buffer prior to determining whether to consume the plurality of rows from the memory buffer when the query specifies the order for the plurality of rows.

Example 15: The method of any one of Examples 9 to 14, wherein the providing further comprises: determining whether to consume the plurality of rows from the memory buffer prior to determining whether to consume the plurality of rows from the disk buffer when the query specifies the order for the plurality of rows.

Example 16: The method of any one of Examples 9 to 15, wherein a second processing thread of the plurality of processing threads stores a second plurality of rows in (a) a second disk buffer associated with the second processing thread in response to determining the second disk buffer contains a second stored row or (b) a second memory buffer associated with the second processing thread in response to determining the second disk buffer does not contain the second stored row and the second memory buffer contains at least a second threshold amount of memory to store the second plurality of rows.

Example 17: A non-transitory computer-readable medium storing instructions, which when executed by at least one data processor, result in operations comprising: receiving a query including a projection; receiving a plurality of rows in response to the query processed by a processing thread of a plurality of processing threads; determining whether the query specifies an order for the plurality of rows; in response to the query specifying the order, determining whether a disk buffer associated with the processing thread contains a stored row; in response to determining the disk buffer contains the stored row, storing the plurality of rows in the disk buffer; in response to determining the disk buffer does not contain the stored row and the memory buffer contains at least a threshold amount of memory to store the plurality of rows, storing the plurality of rows in a memory buffer associated with the processing thread; and providing the stored plurality of rows in response to the query.

Example 18: The non-transitory computer-readable medium of Example 17, wherein the disk buffer includes physical memory, and wherein the memory buffer includes in-memory storage.

Example 19: The non-transitory computer-readable medium of any one of Examples 17 to 18, wherein the operations further comprise: in response to determining the query does not specify the order, determining whether the memory buffer contains the threshold amount of memory; and in response to determining the memory buffer contains the threshold amount of memory, storing the plurality of rows in the memory buffer.

Example 20: The non-transitory computer-readable medium of any one of Examples 17 to 19, wherein the operations further comprise: in response to determining the query does not specify the order, determining whether the memory buffer contains the threshold amount of memory; and in response to determining the memory buffer does not contain the threshold amount of memory, storing the plurality of rows in the disk buffer.

FIG. 7 depicts an example of a database management system 100, in accordance with some example implementations. The database management system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 7, the databases 190A-N represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via the execution engine 150 to the database layer 190A-N, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system, comprising:
    at least one data processor; and
    at least one memory result in operations comprising:
        receiving a query including a projection;
        receiving a plurality of rows in response to the query processed by a processing thread of a plurality of processing threads;
        determining whether the query specifies an order for the plurality of rows;
        in response to the query specifying the order, determining whether a disk buffer associated with the processing thread contains a stored row;
        in response to determining the disk buffer contains the stored row, storing the plurality of rows in the disk buffer;
        in response to determining the disk buffer does not contain the stored row and a memory buffer contains at least a threshold amount of memory to store the plurality of rows, storing the plurality of rows in the memory buffer associated with the processing thread; and
        providing the stored plurality of rows in response to the query.

2. The system of claim 1, wherein the disk buffer includes physical memory, and wherein the memory buffer includes in-memory storage.

3. The system of claim 1, wherein the operations further comprise: in response to determining the query does not specify the order, determining whether the memory buffer contains the threshold amount of memory; and in response to determining the memory buffer contains the threshold amount of memory, storing the plurality of rows in the memory buffer.

4. The system of claim 1, wherein the operations further comprise: in response to determining the query does not specify the order, determining whether the memory buffer contains the threshold amount of memory; and in response to determining the memory buffer does not contain the threshold amount of memory, storing the plurality of rows in the disk buffer.

5. The system of claim 1, wherein the providing comprises: consuming, by a fetching thread, the plurality of rows stored in the disk buffer and/or the memory buffer.

6. The system of claim 5, wherein the providing further comprises: determining whether to consume the plurality of rows from the disk buffer prior to determining whether to consume the plurality of rows from the memory buffer when the query specifies the order for the plurality of rows.

7. The system of claim 5, wherein the providing further comprises: determining whether to consume the plurality of rows from the memory buffer prior to determining whether to consume the plurality of rows from the disk buffer when the query specifies the order for the plurality of rows.

8. The system of claim 1, wherein a second processing thread of the plurality of processing threads stores a second plurality of rows in (a) a second disk buffer associated with the second processing thread in response to determining the second disk buffer contains a second stored row or (b) a second memory buffer associated with the second processing thread in response to determining the second disk buffer does not contain the second stored row and the second memory buffer contains at least a second threshold amount of memory to store the second plurality of rows.

9. A computer-implemented method, comprising:
    receiving a query including a projection;
    receiving a plurality of rows in response to the query processed by a processing thread of a plurality of processing threads;
    determining whether the query specifies an order for the plurality of rows;
    in response to the query specifying the order, determining whether a disk buffer associated with the processing thread contains a stored row;
    in response to determining the disk buffer contains the stored row, storing the plurality of rows in the disk buffer;
    in response to determining the disk buffer does not contain the stored row and a memory buffer contains at least a threshold amount of memory to store the plurality of rows, storing the plurality of rows in the memory buffer associated with the processing thread; and
    providing the stored plurality of rows in response to the query.

10. The method of claim 9, wherein the disk buffer includes physical memory, and wherein the memory buffer includes in-memory storage.

11. The method of claim 9, wherein the operations further comprise: in response to determining the query does not specify the order, determining whether the memory buffer contains the threshold amount of memory; and in response to determining the memory buffer contains the threshold amount of memory, storing the plurality of rows in the memory buffer.

12. The method of claim 9, wherein the operations further comprise: in response to determining the query does not specify the order, determining whether the memory buffer contains the threshold amount of memory; and in response to determining the memory buffer does not contain the threshold amount of memory, storing the plurality of rows in the disk buffer.

13. The method of claim 9, wherein the providing comprises: consuming, by a fetching thread, the plurality of rows stored in the disk buffer and/or the memory buffer.

14. The method of claim 13, wherein the providing further comprises: determining whether to consume the plurality of rows from the disk buffer prior to determining whether to consume the plurality of rows from the memory buffer when the query specifies the order for the plurality of rows.

15. The method of claim 13, wherein the providing further comprises: determining whether to consume the plurality of rows from the memory buffer prior to determining whether to consume the plurality of rows from the disk buffer when the query specifies the order for the plurality of rows.

16. The method of claim 9, wherein a second processing thread of the plurality of processing threads stores a second plurality of rows in (a) a second disk buffer associated with the second processing thread in response to determining the second disk buffer contains a second stored row or (b) a second memory buffer associated with the second processing thread in response to determining the second disk buffer does not contain the second stored row and the second memory buffer contains at least a second threshold amount of memory to store the second plurality of rows.

17. A non-transitory computer-readable medium storing instructions, which when executed by at least one data processor, result in operations comprising:
 receiving a query including a projection;
 receiving a plurality of rows in response to the query processed by a processing thread of a plurality of processing threads;
 determining whether the query specifies an order for the plurality of rows;
 in response to the query specifying the order, determining whether a disk buffer associated with the processing thread contains a stored row;
 in response to determining the disk buffer contains the stored row, storing the plurality of rows in the disk buffer;
 in response to determining the disk buffer does not contain the stored row and a memory buffer contains at least a threshold amount of memory to store the plurality of rows, storing the plurality of rows in the memory buffer associated with the processing thread; and
 providing the stored plurality of rows in response to the query.

18. The non-transitory computer-readable medium of claim 17, wherein the disk buffer includes physical memory, and wherein the memory buffer includes in-memory storage.

19. The non-transitory computer-readable medium of claim 17, wherein the operations further comprise: in response to determining the query does not specify the order, determining whether the memory buffer contains the threshold amount of memory; and in response to determining the memory buffer contains the threshold amount of memory, storing the plurality of rows in the memory buffer.

20. The non-transitory computer-readable medium of claim 17, wherein the operations further comprise: in response to determining the query does not specify the order, determining whether the memory buffer contains the threshold amount of memory; and in response to determining the memory buffer does not contain the threshold amount of memory, storing the plurality of rows in the disk buffer.

* * * * *